Feb. 27, 1962   L. MAFRICA   3,022,842
AUTOMATIC BATCH WEIGHING DEVICE FOR FILLING OR UNLOADING
Filed Dec. 19, 1958   2 Sheets-Sheet 1
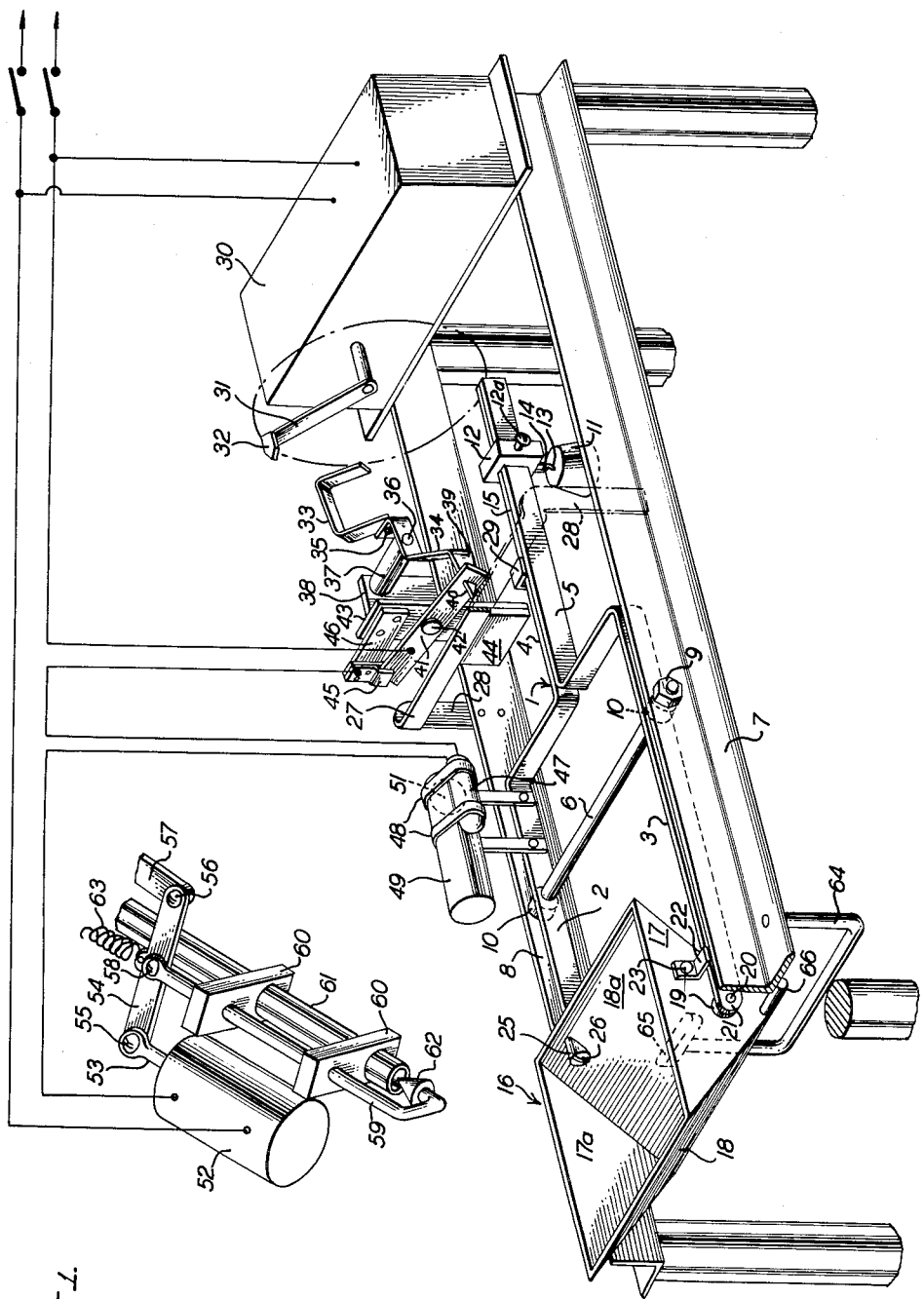
INVENTOR.
LEO MAFRICA
BY
Donald G. Welsh
ATTORNEY

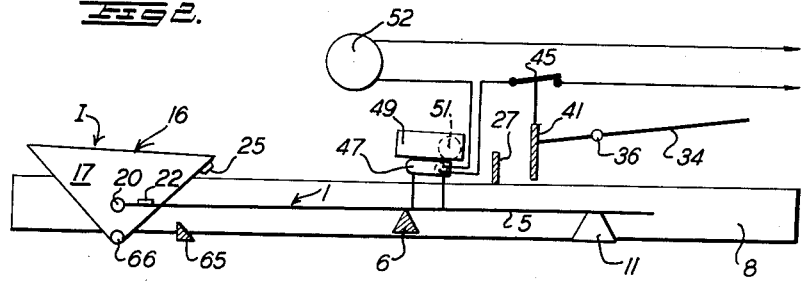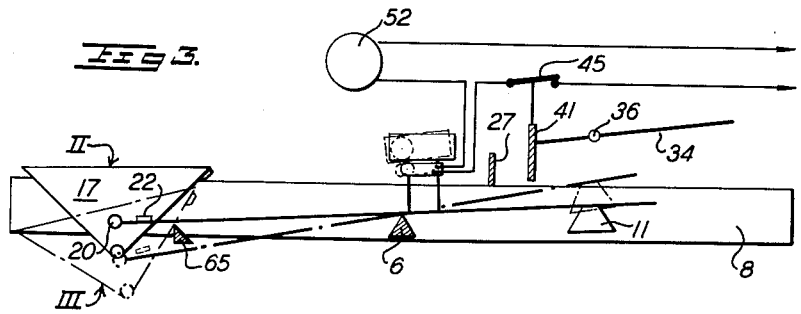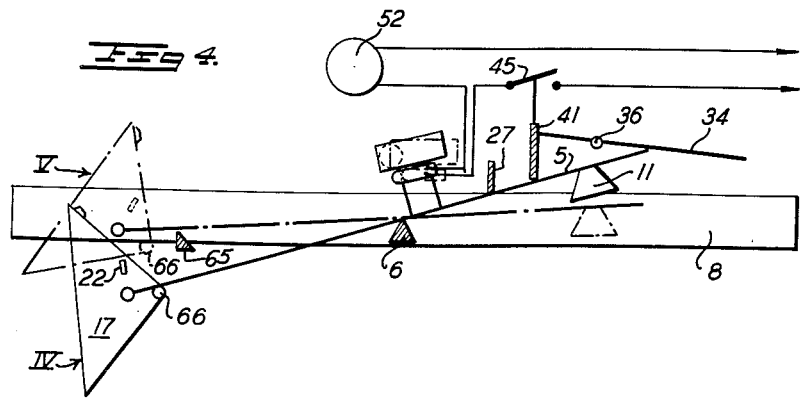

United States Patent Office 3,022,842
Patented Feb. 27, 1962

3,022,842
AUTOMATIC BATCH WEIGHING DEVICE FOR FILLING OR UNLOADING
Leo Mafrica, Pittsburgh, Pa., assignor to the United States of America as represented by the Secretary of the Interior
Filed Dec. 19, 1958, Ser. No. 781,811
5 Claims. (Cl. 177—80)
(Granted under Title 35, U.S. Code (1952), sec. 266)

The invention herein described and claimed may be manufactured and used by or for the Government of the United States of America for governmental purposes without the payment of royalties thereon or therefor.

This invention relates to weighing machines and more particularly to an automatic weighing machine for weighing predetermined amounts of granular, powdered, liquid, or other fluent material from a storage hopper or other container.

Periodic withdrawal of samples from a fluidized bed of solid material for testing or other purposes by manual manipulation of a valve involves considerable time on the part of an operator. Because of the human element, much variation was found to exist in the time intervals between samples and the quantities removed.

It is an object of this invention therefore to provide an improved automatic device to withdraw uniform samples from a container of fluent material.

It is an object of this invention to provide a simple automatic means for withdrawing samples of fluent material at predetermined time intervals in predetermined quantities.

It is a further object of this invention to provide an automatic weighing machine which at a predetermined time interval will open a valve in a vessel containing fluent material, and after a predetermined quantity of material has been removed into a weighing bin, shut the valve and empty the bin, and then repeat the cycle.

It is a further object of this invention to control the valve operation by means of a tilt switch attached to a weighing beam in the weighing machine.

Further objects will be apparent from the following description of the invention, the claims, and the drawings.

This invention consists briefly in a beam type scale pivoted at its midsection, and having a pivoted weighing bin at one end and a movable counterweight at the other. The weighing bin is located beneath an outlet nozzle through which material flows into the bin. An electrical timing device connected in series with a tilting switch (a mercury switch for example) mounted on the weighing beam and a solenoid control member of a valve on the outlet, control the amount of material admitted to the weighing bin. When the amount of material determined by the setting of the counterweight is collected in the bin, the beam tilts, causing the tilt switch to break contact and close the valve. The bin moves downwardly rotating about the weighing beam pivot, and contacts a fixed arm. This causes the bin to rotate about its own supporting axis, emptying it. The beam returns now to its horizontal position and the cycle of operations is repeated.

FIGURE 1 shows an isometric view of the automatic weighing device.

FIGURES 2, 3 and 4 show in schematic form, a section of the weighing device through the longitudinal axis, arranged in sequential order to show the relationship and relative movement of the various components during operation of the device. The roman numerals indicate a particular position. Where not needed some of the reference numbers are omitted from FIGURES 3 and 4.

Referring to the drawing, a forked weighing beam 1 is made up of two Z-shaped members 2 and 3, which have portions 4 and 5 joined together as shown to form arm 15. Pivot rod 6 passes freely through holes in members 2 and 3 and extends into frame members 7 and 8, which in the embodiment shown are angles. The ends of the pivot rod are threaded and fastened to the frame members by nuts 9. Separators 10 space members 2 and 3 from angles 7 and 8. A counterweight 11 is suspended from yoke 12 by eyebolt 13 and hook 14. Yoke 12 is slidably movable along arm 15 and is adapted to be set in a fixed position by set screw 12a. Pivotally mounted at the open end of the forked weighing beam is hopper member 16, having sides 17 and 17a, which are parallel to the end portions of arms 2 and 3, and sloping sides 18 and 18a. Bosses 19 (only one shown) fastened to the outer surface of sides 17 and 17a carries pivot pins 20 which are loosely mounted in corresponding holes 21 at the ends of arms 2 and 3. Stop 22 fastened to outer surface of side 17 by bolt 23 acts to limit the clockwise rotation of hopper 16 by abutting against beam arm 3. The hopper is so mounted as to have its center of gravity slightly to the right of pivot 20. In the embodiment shown, a vertical line drawn from the pivots through the apex of hopper 16 when empty is about two degrees out of plumb, tilting toward the right. A fixed counterweight 25 is fastened to the top inner or outer surface of side 18a by bolt 26, to increase the momentum of bin 16 in its clockwise rotation and maintain the aforesaid tilted position. Horizontal bar 27 spaced above beam portion 15, and fastened to angles 7 and 8 by upright portions 28 acts as a stop to limit counterclockwise rotation of the weighing beam 1. Fastened to arm 15 and vertically adjustable thereon is a circuit breaker arm bumper 29, the purpose of which will become apparent in the description to follow.

Tilting arm 64, is of a generally U-shaped structure which is fastened at one end to angle member 7. The other end 65 is shaped in the form of the letter T and is adapted to bear against the outer surface of side 18a of the hopper when the latter is in its descended position, as will appear more fully hereinafter. Pin 66 is mounted near the bottom of face 17 and serves as a limiting stop for rotation of the hopper counterclockwise, by contacting arm 3. In addition, pin 66 helps rotate hopper 16 clockwise while said hopper is ascending by contacting member 7. Pin 66 also limits clockwise rotation of weighing beam 1 when said weighing beam returns to the horizontal position by contacting member 7.

The timing device 30 is provided with an arm 31 and a bearing head 32. The arm may be rotated by a constant speed electric motor, not shown, having suitable gearing and controls, whereby the rate of rotation can be readily controlled. Arm 31 periodically contacts one leg of U-shaped member 33 which is adjustedly mounted on a rocker arm 34 by bolt 35, so that the angle at which bearing head 32 slidably contacts member 33 may be varied. Arm 34 is rotatably mounted on pivot 36 mounted at the end of stud 37. The latter extends at right angles inwardly from the upper end portion of angle 38 which is fastened to angle member 8. One end of arm 34 is off-set inwardly and terminates in a pointed end 39 which fits loosely in a slot 40 at the end of a lever arm 41. The latter is pivotally mounted on bolt 42 mounted on upright 43 which is fastened to angle 8 by angle bracket 44 (only one leg visible in the figure). Contact clip 45 is mounted in bracket 46 at one end thereof, the other end of the bracket being fastened to upright 43.

Mercury switch 47 is clamped by bands 48 to a closed cylinder 49, which is two degrees off parallel, tilting to the right, when weighing beam is horizontal. Located within cylinder 49 is a ball 51 which is free to rotate and move in a direction similar to the longitudinal axis of the beam under the influence of gravity. The mercury switch 47, contact clip 45, and lever 41 are connected in a series circuit with solenoid 52. Armature 53 of the solenoid is pivotally connected to lever 54 by bolt 55, the lever being fulcrumed at 56 to a fixed supporting arm 57. Pivoted at the central part of lever 54, about bolt 58, is a valve rod 59, which passes through two guide blocks 60 mounted on discharge pipe 61. The end of valve rod 59 is bent in the form of the letter J and has mounted at the end of the short leg, plug 62. Tensile spring 63 connected to lever 54 adjacent bolt 58 acts to keep the valve rod normally in a retracted position, with plug 62 closing discharge pipe 61. A wire (not shown) is mounted on the apex of the plug and extends into the interior of discharge pipe to aid in the discharge of solid material having a tendency to agglomerate. Pipe 61 is connected to a receptacle containing fluent material, and may be connected to a hopper, bin, reactor vessel, pipe, etc.

The operation of the device is as follows: Timer 30 causes end 39 of lever 34 to descend, making contact between the end of lever 41 and contact clip 45. This is position I in FIGURE 2. The circuit is closed, and armature 53 in solenoid 52 is drawn inwardly, thereby retracting conical plug 62 from its seat in the end of discharge pipe 61. Fluent material now flows through pipe 61 into hopper 16. When a given weight of material, predetermined by the position of movable counterweight 11, is reached, the valve is closed and hopper 16 and weighing beam 1 swing about pivot rod 6. Position II of FIGURE 3 (solid lines) illustrates this configuration.

The valve closing is as follows: After the predetermined weight has been reached, the angle of tilt causes the mercury switch to break contact, thereby opening the circuit. Plug 62 acting under the tension of spring 63 now closes the end of discharge pipe 61 stopping the flow of material.

The center of gravity of the now loaded hopper shifts to the left from its original position, and the resulting turning moment acts to overcome the frictional forces and the opposing turning moment due to counterweight 25 and the weight of the hopper. The hopper descends until the outer surface 18a reaches fixed tilter arm 65, as shown in III of FIGURE 3 (dotted lines). At this stage hopper 16 is tilted counterclockwise and dumps out its contents, projecting pin 66 limiting the degree of rotation by contacting arm 3. Steel ball 51 rolls from right to left as the hopper descends, thereby decreasing the moment of force counterbalancing the hopper so that once the hopper starts descending, this travel becomes accelerated. Upward movement of rear portion 5 of beam 1 causes circuit breaker arm bumper 29 to tilt lever arm 41 and opens switch contact 45. Position IV in FIGURE 4 (solid lines) shows the configuration of the components at this stage.

After dumping the load, the weighing beam now returns to the horizontal position, under the influence of counterweight 11. This is shown in position V (dotted lines) in FIGURE 4.

The weighing beam now returns to the horizontal position. Projecting pin 66 contacts angle member 7 to restore (1) the hopper to its original upright position, and (2) to limit the clockwise rotation of weighing beam to its horizontal position. Stop 22 limits the resulting clockwise rotation of the hopper by coming in contact with the upper part of arm 3.

This cycle is repeated as arm 31 continues to rotate. It is obvious that by adjusting the speed of rotation of arm 31 and the setting of the counterweight 11, the amount of sample removed and the time between samples may be readily varied.

It is believed readily apparent that many substitutions of equivalent elements may be made without affecting the essential inventive features of the device. For example, instead of a solenoid operated valve mechanism, a closure device operated by an electric motor may be substituted. The conical plug, with or without attached wire, could be replaced by a slide valve, a gate valve, a globe valve. Instead of a plug or valve controlled discharge device, a conveyor or feeder mechanism may be substituted controlled by the tilting of the weighing beam, as described. Other timing devices such as mechanical or electrical clock mechanism for example could be substituted for that shown in the above embodiment. Instead of a rolling ball in a closed cylinder, a liquid in a cylinder or a sliding weight could be employed. If desired, a counter can be installed to count the number of cycles. These and other changes in the details of the invention may be made within the spirit thereof, the scope of which is to be broadly construed and not to be limited except by the character of the claims appended hereto.

I claim:

1. Apparatus of the character described for periodically removing a predetermined amount of fluent matter from a container, which comprises, a weighing beam mounted for pivotal movement about a horizontal axis, a receptacle at one end of said beam, electrical switch means including a pair of contacts adapted to make contact at predetermined time intervals, a tilt switch in series circuit with said electrical switch means, said tilt switch being mounted on the weighing beam, whereby a predetermined amount of pivotal movement of the weighing beam causes the tilt switch to open, outlet means connected to said container, valve means in said outlet means, means connected in circuit with said electrical switch means and said tilt switch for opening and closing said valve means, whereby closing said circuit opens the valve means and permits fluent material to leave the container, while opening said circuit closes the said valve means, means for emptying the weighing hopper after it has a predetermined weight of material, and means for thereafter opening said electrical switch means.

2. Apparatus of the character described for periodically removing a predetermined amount of fluent matter from a container, which comprises a frame, horizontal pivot means mounted in said frame, a counterbalancing weighing beam mounted on said pivot means, means for varying the balancing movement on said weighing beam, weighing hopper means mounted at an end portion of said weighing beam, electrical switch means, means for periodically opening and closing said electrical switch means, a tilt switch in circuit and in series with said electrical switch means, said tilt swtch being mounted on the weighing beam parallel to the longitudinal axis thereof, whereby a predetermined amount of pivoting movement of the weighing beam interrupts the tilt switch and thus opens the circuit, an outlet for fluent matter in said container, said outlet being adapted to conduct fluent material to the weighing hopper means, valve means in said outlet, means connected in circuit with said electrical switch means and said tilt switch for opening and closing said valve means, whereby when said circuit is open the valve means is closed and when said circuit is closed the valve means is opened and fluent material passes into the weighing hopper until an amount as determined by the balancing movement on the weighing beam is reached, whereupon the weighing beam pivots about its horizontal pivot means thereby interrupting the tilt switch and opening the circuit, means for emptying the weighing hopper after it has a predetermined weight of material, and means for thereafter opening said electrical switch means.

3. Apparatus of the character described for periodically removing a predetermined amount of fluent matter from a container, which comprises a frame, horizontal pivot means mounted in said frame, a weighing beam mounted on said pivot means for limited angular movement from a horizontal position, a counterweight attached at one end of said beam, means for adjustably attaching the counterweight at spaced positions along the beam, a receptacle mounted at the other end of said weighing beam, said receptacle being pivotally mounted about an axis transverse to the longitudinal axis of the weighing beam, whereby the beam tilts and the receptacle member descends on receiving fluent material, electrical switch means including a pair of contacts adapted to make electrical contact at predetermined time intervals, outlet means attached to said container for permitting egress of material from the container, valve means in said outlet means, electrically powered means connected in circuit with said switch means for controlling said valve means, a tilt switch mounted on said weighing beam connected in circuit with said switch means and electrically powered valve controlling means, whereby a predetermined amount of tilting movement of the weighing beam interrupts the circuit, a movable weight on said weighing beam member between the horizontal pivot and the counterweight, said movable weight being adapted to move under the influence of gravity in a direction generally along the longitudinal axis of the weighing beam, stop means for limiting the movement of said movable weight receptacle member dumping means including a fixed arm adapted to contact the member at a position spaced from its rotatable axis when in descended position, whereby the receptacle pivots about its axis thereby emptying its contents, means for thereafter opening said electrical switch means, and means for limiting the pivoting motion of the receptacle member.

4. In an apparatus for repeatedly sampling a fluent material, comprising a means for discharging the material in a flowing stream, and having an electrically controlled means to open and close a valve to regulate the flow of material, a weighing arrangement including a pivotally mounted weighing beam and a receiving means for the material discharged, pivotally mounted on said beam, a source of electrical power, a timing device having a rotating element, an arm means rockably mounted in the apparatus, and periodically coacting with said rotating element, a pivotally mounted lever of conductive material having an electrical connection with said source, and flexibly attached to said arm, said lever being moved to an operative position by said arm when the latter is acted upon by said rotating element, a normally closed switch mounted on said weighing beam to move therewith and to open its circuit completing parts when said beam is deflected in response to a predetermined weight of material in said receiving means, a switch element attached in said apparatus, and operably effective in a circuit with said circuit completing part of the normally closed switch, said electrically controlled means, and the source whereby, said circuit is completed to operate said controlled means to open said valve when said lever is moved to operative position wherein the lever contacts the switch element, and further means on the said weighing beam, operative when the beam is deflected to coact with said lever to release the latter from contact with the switch element and return the lever to inoperative position, and thereby open the said circuit completed by the action of the arm on the said lever.

5. The structural arrangement of claim 4, wherein the portion of the rockable arm directly coacting with said rotatable element, comprises an adjustable member.

References Cited in the file of this patent

UNITED STATES PATENTS

| | | |
|---|---|---|
| 507,531 | Drawbaugh | Oct. 31, 1893 |
| 564,945 | Simon | July 28, 1898 |
| 2,670,920 | Meadors | Mar. 2, 1954 |
| 2,823,005 | Lindars | Feb. 11, 1958 |
| 2,919,099 | Pelz | Dec. 29, 1959 |